United States Patent [19]

Nakamats

[11] Patent Number: 5,156,927
[45] Date of Patent: Oct. 20, 1992

[54] FILM ELECTRIC GENERATION SYSTEM

[76] Inventor: Yoshiro Nakamats, 1-10-309, Minami-Aoyama 5-chome, Minato-ku, Tokyo, Japan

[21] Appl. No.: 619,857

[22] Filed: Nov. 29, 1990

[51] Int. Cl.⁵ .............................................. H01M 8/18
[52] U.S. Cl. ................... 429/21; 204/DIG. 4; 429/30
[58] Field of Search .............. 429/21, 30; 204/DIG. 4

[56] References Cited

U.S. PATENT DOCUMENTS

| | | | |
|---|---|---|---|
| 3,522,099 | 7/1970 | Schultz et al. | 429/21 |
| 4,640,875 | 2/1987 | Mariel | 429/30 |
| 4,693,945 | 9/1987 | Ohyauchi et al. | 429/21 |
| 4,808,491 | 2/1989 | Reichner | 429/30 |
| 4,988,580 | 1/1991 | Ohsaki et al. | 204/DIG. 4 |
| 5,082,751 | 1/1992 | Reichner | 429/30 |

*Primary Examiner*—William R. Dixon, Jr.
*Assistant Examiner*—Willie I. Thompson
*Attorney, Agent, or Firm*—Jordan and Hamburg

[57] ABSTRACT

A unitary fuel cell system for converting electric energy to chemical energy and for converting chemical energy to electric energy comprises a gas generating system for generating hydrogen by electrolysis, a storage arrangement for generated hydrogen, and a fuel cell having a solid polyelectrolytic film for generating electricity in response to the application thereto of hydrogen from the storage arrangement.

10 Claims, 4 Drawing Sheets

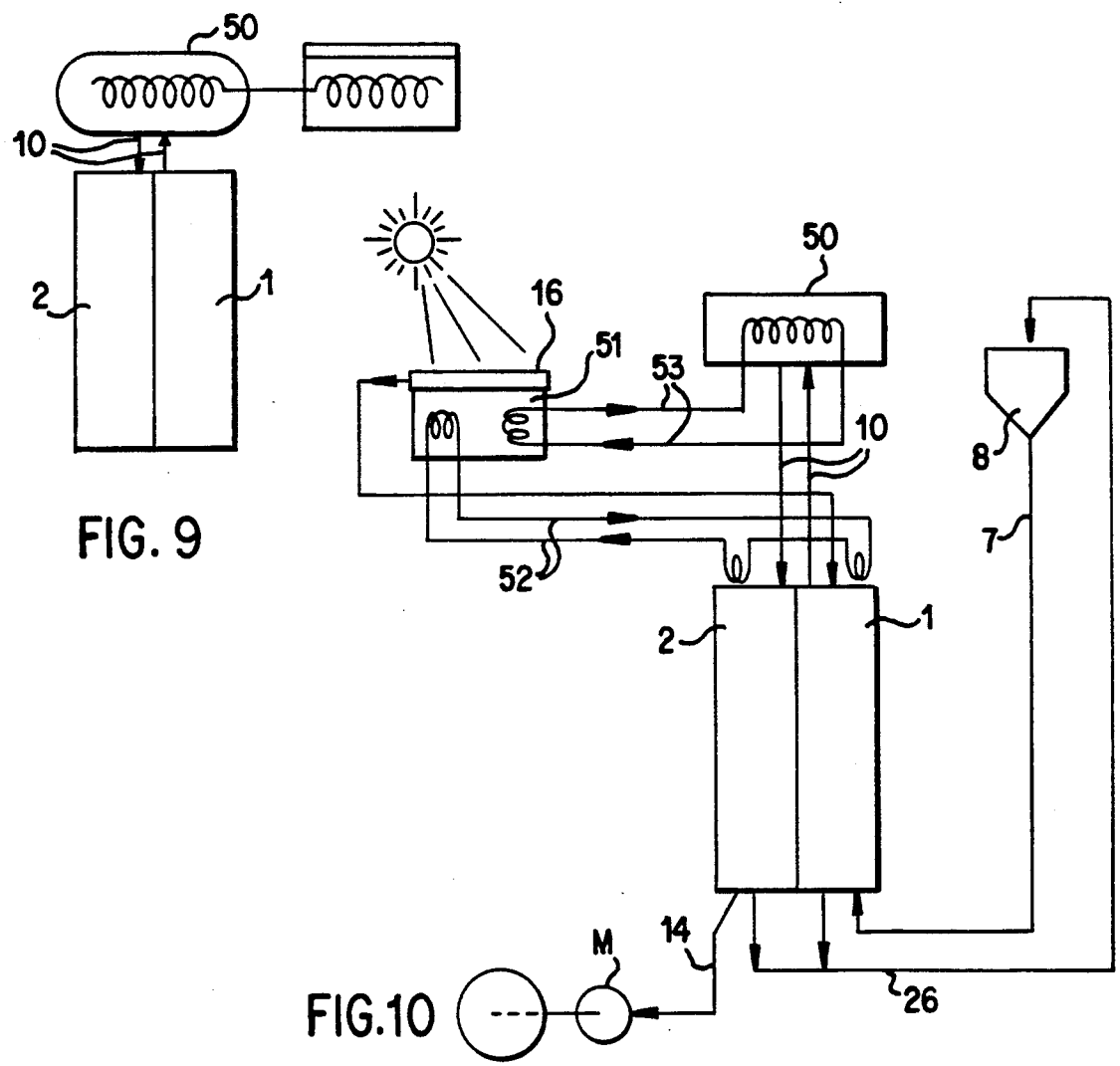
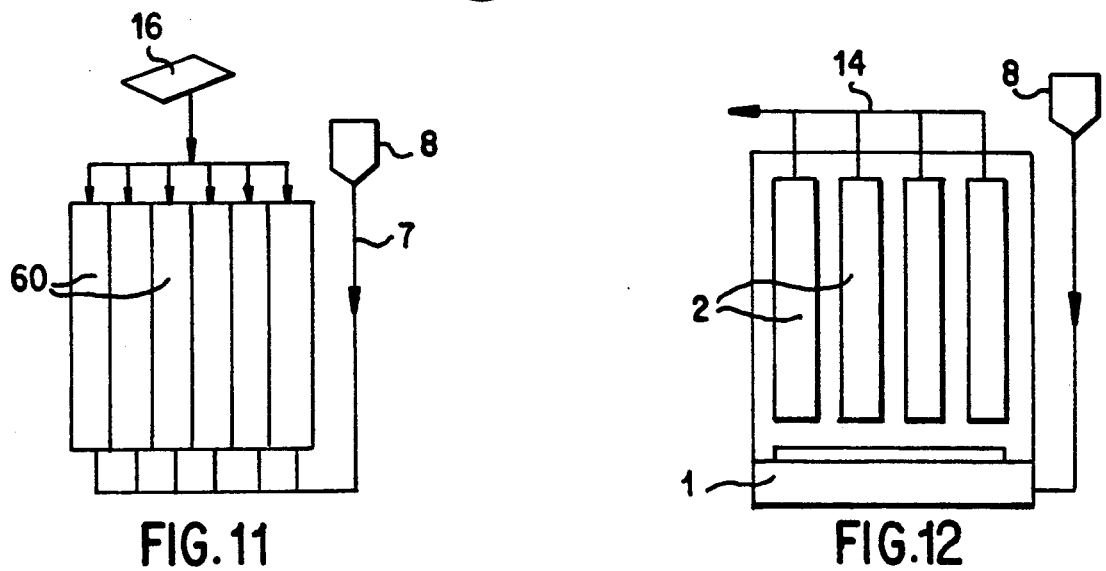

FILM ELECTRIC GENERATION SYSTEM

FIELD OF THE INVENTION

This invention relates to an electric generation system that enables the generation of electricity from water with high efficiency.

The invention provides an electric generation system combining a fuel generation apparatus for producing a fuel gas such as hydrogen, etc. from a solid polyelectrolytic film by electrolysis, and a fuel electric cell.

BACKGROUND OF THE INVENTION

Much attention has been paid in the past to the provision of an electric automobile running on electric power generated by a solar cell receiving sunrays, from the standpoint of the lack of air pollution from the exhaust gas and the saving of energy. Such an arrangement has such disadvantages, however, as inferior start-dashing, difficulty of obtaining high speeds and short travelling distance, since conventional cells are heavy and bulky, and must be mounted on the car for driving even when sunshine is not available.

Also, in computer systems, many memory devices are used, and standby power sources for emergency use must be installed so that records stored in the memory devices are not erased even upon a sudden power outage. Such power sources are heavy and bulky, requiring more area than the installation area of computer system itself, and are expensive and inconvenient to handle.

SUMMARY OF THE INVENTION

This invention is directed to the provision of a solution the above problems.

BRIEF DESCRIPTION OF THE DRAWING

In order that the invention may be more clearly understood, it will now be disclosed in greater detail with reference to the accompanying drawing, wherein:

FIG. 9 is a side view of the fourth embodiment;

FIG. 10 is a side view of the fourth embodiment;

FIG. 11 is a side view of the fifth embodiment; and

FIG. 12 is a side view of a sixth embodiment;

DETAILED DISCLOSURE OF THE INVENTION

Figure 1:
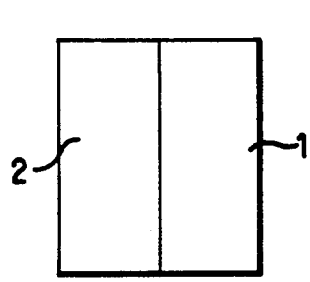
FIG. 1 is a simplified side view of a first embodiment of the invention.

FIG. 1 illustrates an example of this invention showing a simplified overall view of a film electric generation system for combining a fuel generation apparatus 1 with a solid polyelectrolytic film and a fuel cell 2 with a solid electromotive film, these elements being closely in contact with one another.

Figure 2:
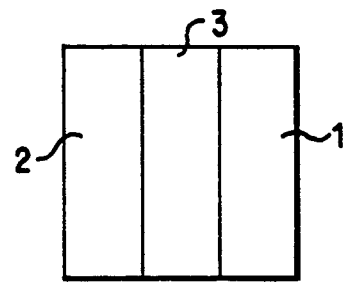
FIG. 2 is a simplified side view of a second embodiment.

FIG. 2 is a simplified example of the invention wherein a fuel gas storing and exhausting portion 3 is provided between the fuel generation apparatus 1 and the fuel cell 2, thereby showing an overall view of the film electric generation system as combined to be in close mutual contact.

Figure 3:
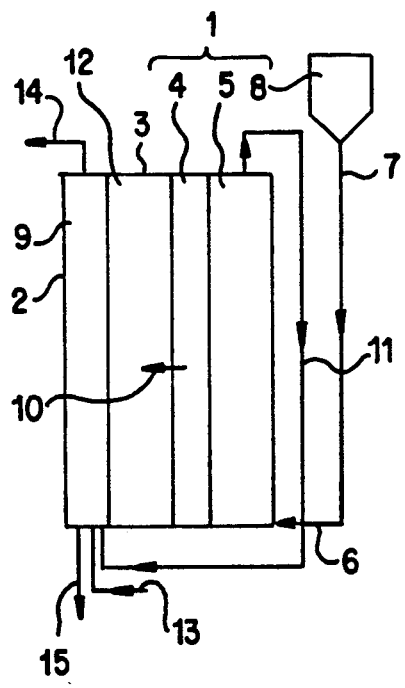
FIG. 3 is a simplified longitudinal section of the embodiment of FIG. 2.

FIG. 3 illustrates the concept of the invention wherein the fuel generation apparatus 1 is comprised of an electrolytic bath 5 with solid polyelectrolytic film 4 contained therein, and a water tank 8 for supplying water 6 to the electrolytic bath 5 via pipe 7. The fuel cell 2 has a solid electromotive film 9. Water 6 is separated into hydrogen 10 and oxygen 11 by supplying electricity to electrolytic film 4, and the hydrogen thereby generated is absorbed by the hydrogen storage alloy 12 and exhausted. Electric power is generated on lines 14 when hydrogen together with oxygen 11 or air 13 contact the solid electromotive film 9, and water is drained at reference numeral 15.

Figure 4:
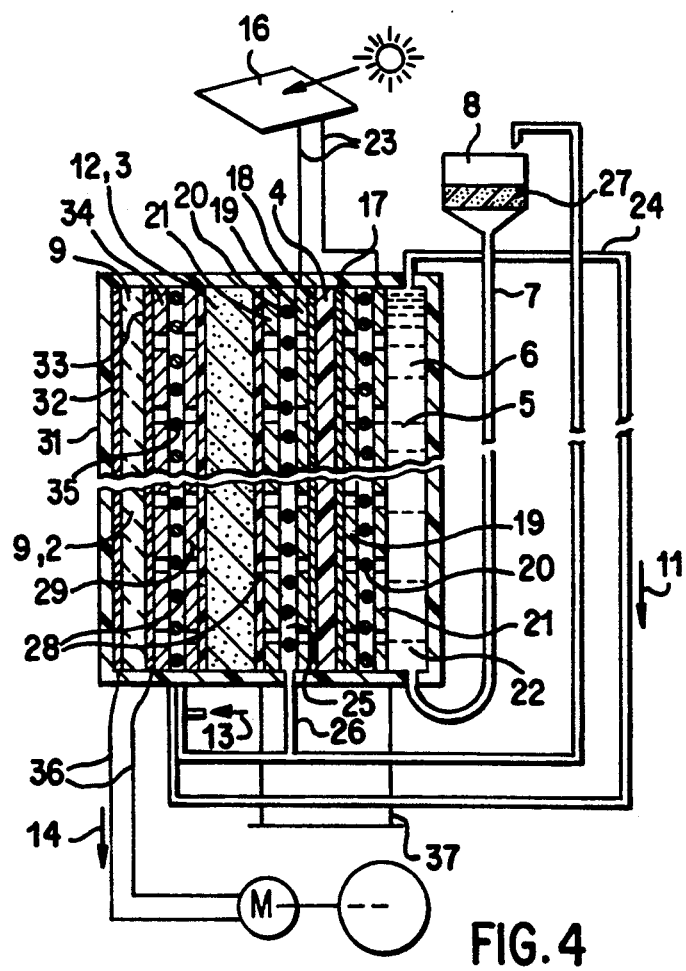
FIG. 4 is a longitudinal section of FIG. 2.

As shown in greater detail in FIG. 4, the electric generation system of this invention, with solid electromotive film 9 for producing electricity by using hydrogen generated at the electrolytic film 4, is mounted on an electric automobile powered by electric power from a solar cell 16 mounted on the car.

The electrolytic film 4 is a solid polyelectrolytic film consisting of a cation exchange film having the following structural formula:

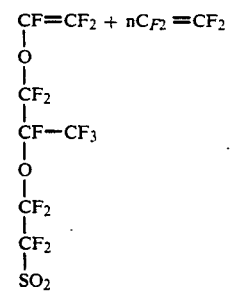

Thin film gas permeable positive electrode and negative electrode 18 of anti-corrosive catalytic metals such as platinum of the platinum group, rhodium, palladium, lutenum, iridium, etc. are connected to opposite sides of this electrolytic film. Apertured metal plate 19, metal net 20 and another apertured metal plate 21 are fastened onto these electrodes, and the water chamber 22 is provided on the outside of the apertured metal plate 21 on the positive electrode.

Electric power from the solar cell 16 mounted on the roof of the automobile is applied to the positive electrode 17 and negative electrode 18 via wire 23 and apertured metal plate 21, so that electrolysis occurs with water permeating from water chamber 22 to electrolytic film 4, and generated oxygen gas, in the form of foam, rises within the water chamber 6 and is discharged from pipe 24.

A chamber 25, to be filled with generated hydrogen, gas is located on the negative side of electrolytic film, and water slightly permeates the electrolytic film to be discharged from drain pipe 26.

Since water within water chamber 22 decreases during electrolysis, water is supplemented from water tank 8 to water chamber via pipe 7. Since pure water is required for the electrolytic film 4, a layer of ion exchange resin 27 is provided on the bottom of water tank 8 to change conventional city water to pure water. Consequently there is no need for distilled water as a supply source of pure water. The water tank 8 is placed at a higher position than the water chamber 6 to apply pressure to water flowing to the electrolytic film 4.

Apertured metal plates 19, 21 and metal net 20 exposed to electrolytic liquid are plated with platinum, and the water chamber 22 is made of noncorrosive materials, for instance plastics such as fluoric resin, or titanium. According to experiments, the volume of hydrogen produced by an electrolytic film 4 with 2 cm diameter is 12.59 cc/minute at 12 V, 2.5 A, 9.98 cc/minute at 12 V, 2.0 A, 7.53 cc/minute at 12 V, 1.5 A, 5.00 cc/minute at 12 V, 1.0 A and 2.42 cc/minute at 12 V, 0.5 A.

Particles of hydrogen storage alloy 12 consisting of iron and titanium or iron plus titanium plus Niobium, invented by the present inventor, are filled in the hydrogen storing portion 3. Both sides of the hydrogen storing portion 3 are covered with film 28, so that water permeating from the electrolytic film or water produced by fuel cell 2 does not wet the hydrogen storage alloy 12. This film 28 is made of porous materials that pass hydrogen but not water, such as flouric resin. The the outside of the film 28 is supported by porous plate 29 to protect the film 28.

Fuel cell 2 of the invention combines hydrogen from the hydrogen storage alloy with air or oxygen obtained by electrolysis through solid electromotive film 9, to convert to electric energy and to form water.

Compared with a conventional engine using fuel used by a fuel cell, the fuel cell is high in fuel efficiency and its cost is quite high.

Figure 5:
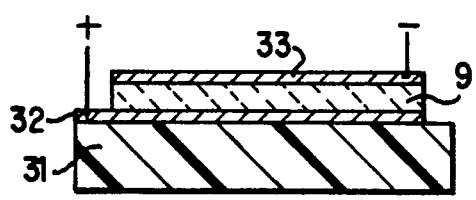
FIG. 5 is partial side view of the FIG. 2; .

As shown by FIG. 5, the fuel cell 2 of the invention has a platinum positive electrode 32 mounted on a substrate 31 that does not pass gas. A solid ion-conductive electromotive film 9 that passes gas is mounted on the platinum positive electrode 32, and a platinum film negative electrode 33 that passes gas is mounted on the solid electromotive film 9. The film 9 is made of aluminum hydroxide consisting of low density AlOOH.

After aluminum is sputtered to less than 50 nm thickness on the electrode 32 prepared on substrate 31, the substrate is dipped into boiled water to change the aluminum to hydrated aluminum oxide, and the negative electrode 33 is then formed on the hydrated aluminum oxide.

When mixed gas of hydrogen with air or oxygen is supplied to the solid electromotive film 9 from the side of negative electrode, approximately 1 volt is produced between the negative and positive electrodes to obtain electric power.

When a mixed gas of hydrogen with air is used, more than 950 mV of voltage is produced between the electrodes, and the voltage, as shown by FIG. 5, remains almost unchanged with air exceeding 50% of hydrogen.

Figure 6:
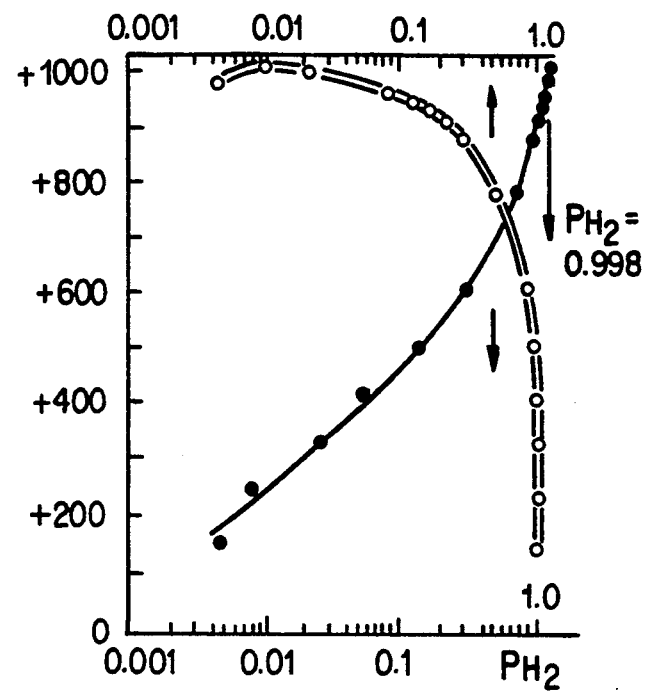
FIG. 6 is the graph of the embodiment of FIG. 2.

FIG. 6 shows the characteristics of a mixed gas of 50% hydrogen and 50% air which contacts the solid electromotive film 9 in a 0.2 cm sq. area fixed on platinum positive and negative electrodes under room temperature.

If the platinum of the negative electrode only is changed to nickel, this changes the polarity of the device. In this case, the voltage within a mixing range from 10% hydrogen plus 90% oxygen to 90% hydrogen plus 10% oxygen is $400 \pm 20$ mV.

If the positive electrode is plated with nickel instead of platinum, the voltage between the two electrodes is easily influenced by the structure of the mixed gas, and the voltage is 200 mV with a mixed gas of 10% hydrogen plus 90% oxygen and 600 mV with a mixture of 90% hydrogen and 10% oxygen.

The polarity also changes when gas is changed from hydrogen to methanol. If both electrodes are plated with platinum and a mixed gas of methanol vapor with oxygen is used, the voltage between the electrodes is $-620$ mV$\pm 20$ mV.

When fuel gas or oxygen only is used, hardly any voltage is generated.

The fuel cell of the invention can be made extremely thin and light, and at present it is possible to produce electric power density up to 1 kw/kg.

Even if the solid electromotive film 9 is replaced with a solid polyelectrolytic film 4, the results are almost the same.

As shown in FIG. 4, the apertured metal plate 34 is attached to the negative electrode 33 of fuel cell 2 to protect the negative electrode 33, and contacts the porous layer 29 of the hydrogen storage alloy through the metal net 35. Fuel generation apparatus 1, hydrogen storage alloy layer 3 and fuel cell 2 are assembled into a single unit and contained in container 31.

Hydrogen produced by the fuel generation apparatus 1 is absorbed by the hydrogen storage alloy layer 12 and discharged, and electricity is generated by the fuel cell 2 and applied to the motor M via the wire 36, to drive the motor to rotate the wheels of the car.

The hydrogen storage alloy layer 12 is heated by heat from the electric supply to the fuel generation apparatus 1, and also from the reaction of the fuel cell 2, and it is conditioned to easily discharge absorbed hydrogen. If the hydrogen storage alloy layer 12 is cooled by passing a water-cooled pipe in the hydrogen storage alloy 12 and hydrogen gases stored in hydrogen storage alloy 12 by pressure coming from said water tank 8, it is possible to run the automobile by releasing hydrogen stored in the hydrogen storage alloy layer to the fuel cell, even under the condition that the automobile drives into the shade and the solar cells 16 do not receive sunlight, and as a result to not produce hydrogen at the electrolytic film 4.

The electric circuit can be made to supply constant current from the optical cell to the electrolytic film 4. If heat generating parts such as a transistor for a rectifier are used for this circuit, and if water entering the water chamber 6 is heated by such heat generating parts, the electrolytic efficiency can be enhanced.

Drained water is collected in the water tank 8 after running down through the gaps of the metal nets 20 and 35.

The electrolytic film 4 and solid electromotive film 9 extend vertically as illustrated. If these parts receive vibration as a result of their being fixed directly on automobile body by supporter 37, oxygen foams within water chamber 22 are easily shaken off, thereby accelerating the chemical reaction and water drain.

When oxygen taken from the pipe 24 by electrolysis is released to the crew cabin of the vehicle, it is possible to protect the driver from sleepiness. The oxygen can also be supplied to the fuel cell 2.

Figure 7:
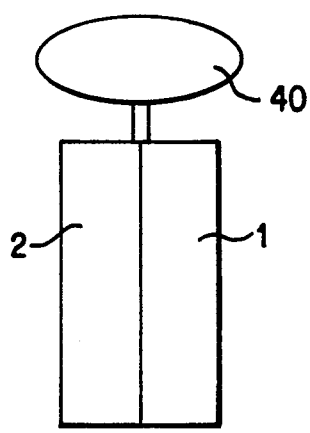
FIG. 7 is a simplified side view of the third embodiment.
Figure 8:
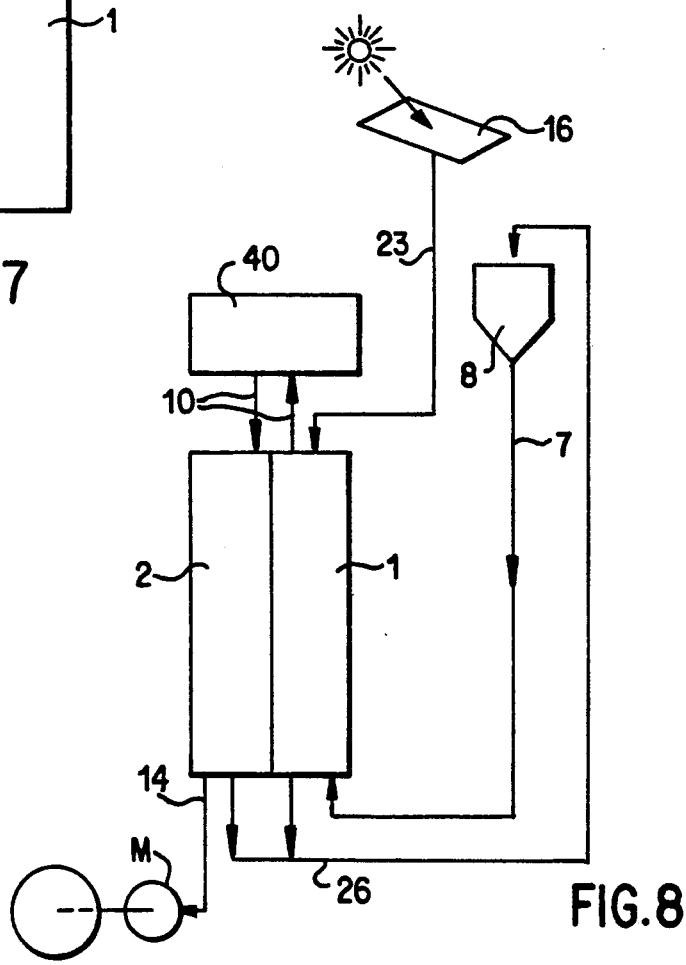
FIG. 8 is a side view of a fourth embodiment.

FIG. 7 is a simplified figure showing the example of this invention wherein a hard or soft tank 40, such as a rubber balloon for storing fuel, is provided and connected to an assembly comprised of the fuel generation apparatus 1 and the fuel cell 2 which are closely in contact with one another. FIG. 8 shows a simplified figure employing the reference numerals used in FIG. 7.

When mounting this apparatus on an automobile as described in the previous examples, hydrogen within the tank 40 is used to run the automobile, if hydrogen is not produced by the electrolytic film 4 for such reason as the vehicle being located in the shade.

FIG. 9 is a simplified figure showing an example of the invention wherein a tank 50 containing the hydrogen storage alloy 12 is separately prepared and connected to a unit comprised of fuel generation apparatus 1 and fuel cell 2.

FIG. 10 shows this example in greater detail. This example, as well as the previous examples, are adapted to drive the automobile, even if hydrogen is not available from electrolytic film 4 for such reason as the shade, etc. A heat storing substance 51 is provided on the back of the solar cell 16 to store solar heat received by the solar cell 16, and also pipe 52 through which thermal medium flows, is arranged to store heat generated by operation of fuel generation apparatus 1 and fuel cell 2 at heat storing substance 51, so that the automobile can run even when passing in the shade. Stored heat is sent to tank 50 through pipe 33 where the thermal medium flows, so that hydrogen is generated and sent to fuel cell 2 for electric generation to run the automobile.

FIG. 11 illustrates an example of the invention wherein a plurality of units 60 are assembled to form the fuel generation apparatus 1 and the fuel cell 2 into one body and are connected in parallel. The number of units 60 can be increased or decreased according to capacity required by the system.

FIG. 12 shows an example of the invention wherein the fuel generation apparatus 1 is set horizontally and a plurality of fuel cells 2 are arranged in parallel vertically with, for instance, hydrogen coming from the surface of fuel generation apparatus 1 being sprayed directly on many fuel cells.

The fuel cell of this invention is compact and does not require complicated technology such as separating used gas and liquid electrodes, is fully sealing, and controls the pressure of the two gases, etc. in a manner similar to conventional fuel cells. The fuel cell of the invention can therefore be manufactured at low cost.

The temperature at the electrodes of conventional fuel cells must be keep at approximately 1,000 degrees C., but fuel cell of the present invention can work at room temperature. Consequently the present invention has the advantage that electricity can be supplied rapidly in the order of a millisecond.

As shown in FIG. 6, the electric potential at the electrodes is correlated with the logarithm of partial pressure of gas according to NERNST rule, and the maximum electric potential can be obtained when contacting mixed gas of 99.9% H2+0.1% 02 with same film as the electrolytic film 4.

The fuel cell of the invention is low in cost and small and light.

This invention has the following advantageous effects.

(1) Since the invention is a system generating electricity from water and storing electricity, it is safe and easy to handle.

(2) The system is small, light, high in efficiency and low in cost, compared with the cell mounted on a conventional electric automobile.

(3) By-produced oxygen improves the environment within a car, prevents sleepiness of driver and contributes to safe driving.

(4) The system is applicable to a methanol car and an LPG car.

Figure 13:
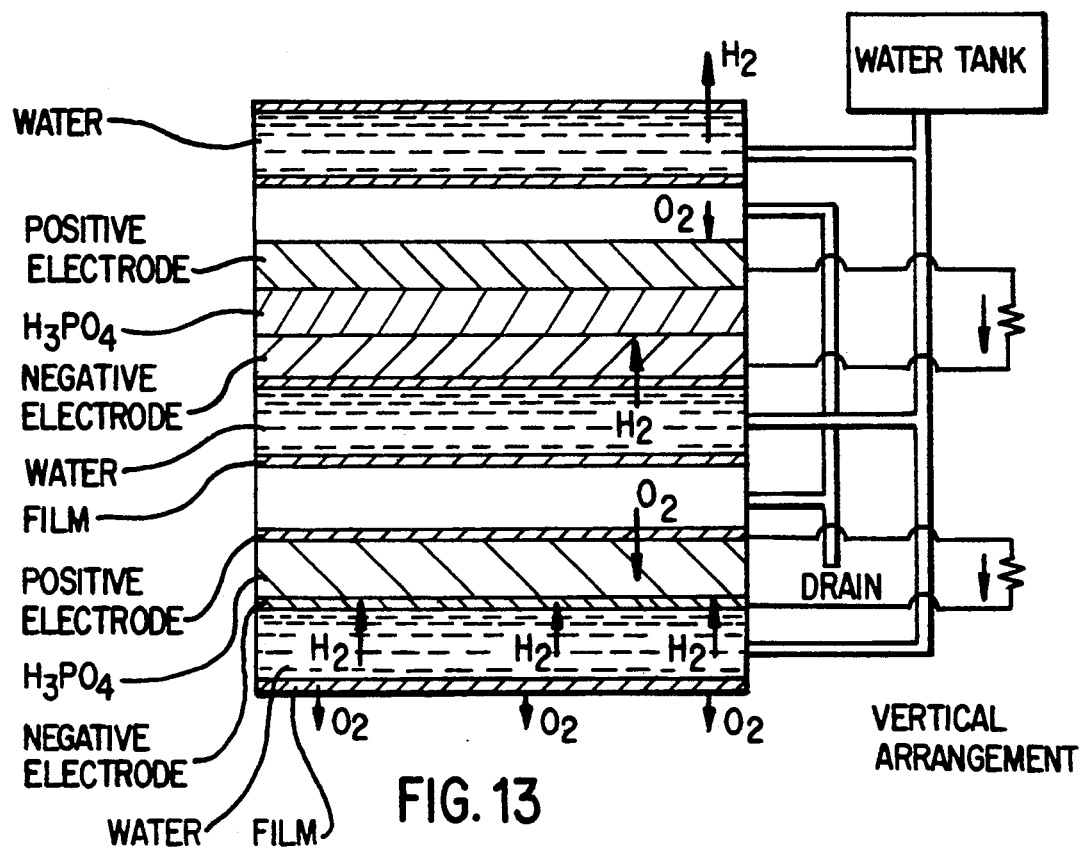
FIG. 13 is a cross sectional view of a vertically aligned arrangement in accordance with the invention.
Figure 14:
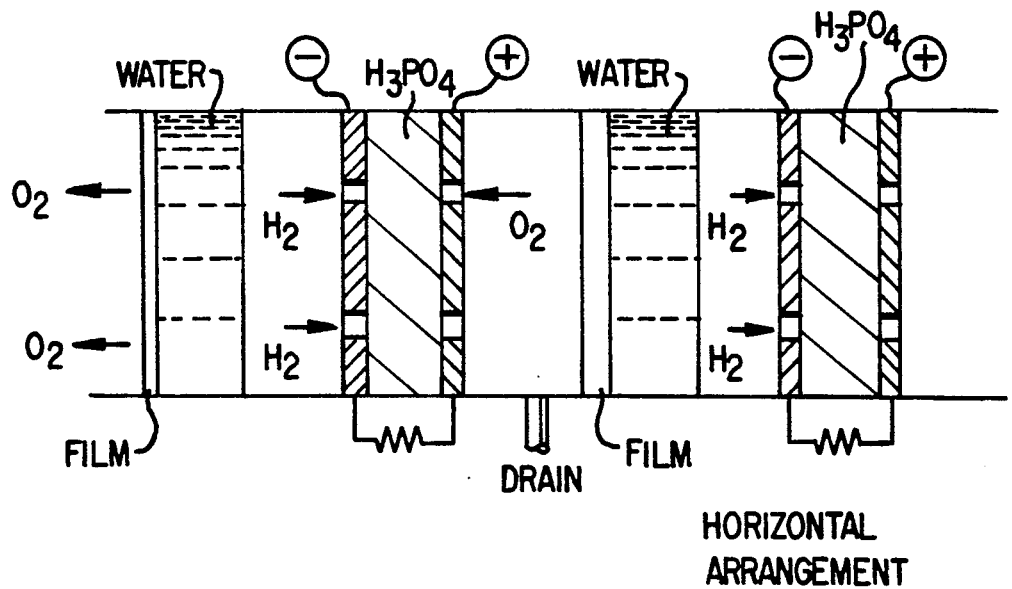
FIG. 14 is a cross sectional view of a horizontally aligned arrangement in accordance with the invention.

FIG. 13 is a cross sectional illustration of a system in accordance with the invention, wherein a plurality of units are arranged vertically. FIG. 14 is a cross sectional illustration of a system in accordance with the invention, wherein a plurality of units are arranged horizontally.

The system of the invention provides high efficiency in the generation of electricity. Theoretically 100% of the energy is usable, and experiments show that 60% is usable. The system does not generate noise, and does not raise any environmental problems.

It provides high efficiency, even on a small scale. A conventional gas engine provides 20% efficiency. A diesel engine is a large scale product, generating over 1000 kw. A gas turbine is also a large scale product, generating over 100,000 kw. The arrangement in accordance with the invention, however, provides 40% efficiency in a device that generates 100 kw. The device of the invention provides a high efficiency, of for example 30%, even under partial loads.

Exhaust heat of the invention can be used to increase the efficiency of the film hydrogen generator, by heating it. The use of known heaters or water heaters can result in a 40% efficiency increase, in addition to providing electrical energy with a total efficiency up to 80% of the usable energy.

As a consequence, the total efficiency of the device of the invention is 80% to 95%.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A film electric generation system comprising a solid polyelectrolytic film for producing gas, a fuel cell comprising a solid electromotive film, and means for supplying gas produced from solid polyelectrolytic film to said fuel cell.

2. A fuel cell system comprising a combined fuel cell and a fuel gas generation apparatus, said fuel cell having a solid electromotive film and said gas generation apparatus having a solid polyelectrolytic film.

3. The system of claim 2 wherein said system further comprises a fuel gas storing and exhausting means.

4. The system of claim 3 wherein said gas generation apparatus comprises an electrolytic bath with said solid polyelectrolytic film therein, and means applying water to said bath.

5. The system of claim 4 wherein said fuel gas storing and exhausting means is mounted between said fuel cell and said gas generating apparatus.

6. The system of claim 5 further comprising a solar cell connected to said gas generation apparatus to cause electrolysis therein.

7. The system of claim 5 wherein said fuel cell comprises electrodes of an anti-corrosive catalytic metal on opposite sides of said solid electromotive film.

8. The system of claim 7 wherein said electrodes are of platinum.

9. The system of claim 7 wherein said electromotive film is a film of low density AlOOH.

10. The electric generating system of claim 1 wherein said solid electromotive film is comprised of $H_3PO_4$.

* * * * *